United States Patent [19]

Williamson

[11] 4,271,699
[45] Jun. 9, 1981

[54] SHEET THICKNESS MONITORING SYSTEM AND METHOD

[76] Inventor: Harry L. Williamson, P.O. Box 1, Hwy. 1788, Franklin, Ky. 42134

[21] Appl. No.: 102,108

[22] Filed: Dec. 7, 1979

[51] Int. Cl.³ .............................................. G01B 5/06
[52] U.S. Cl. ..................................... 73/159; 33/147 L
[58] Field of Search .......................... 73/159; 33/147 L

[56] References Cited

U.S. PATENT DOCUMENTS

| | | | |
|---|---|---|---|
| 3,474,668 | 10/1969 | Mangan | 73/159 |
| 3,552,203 | 1/1971 | Freeh | 73/159 |
| 3,676,933 | 7/1972 | Slone | 33/147 L |
| 3,750,294 | 8/1973 | Belke et al. | 33/147 L |

*Primary Examiner*—S. Clement Swisher
*Attorney, Agent, or Firm*—Mason, Fenwick & Lawrence

[57] ABSTRACT

A sheet thickness monitoring system includes a motor driven threaded rod extending across a conveyor above the path of corrugated sheets fed by the conveyer; the rod supports transversely reciprocating first and second linear variable differential transformers each having a vertically movable armature with a roller on its lower end positioned to engage the sheets so that thickness variations in the sheets provide voltage variations from the transformers. Output voltage signals from the transformers are averaged over a predetermined time period and a warning signal is actuated when the average signal strength falls below a predetermined value.

1 Claim, 7 Drawing Figures

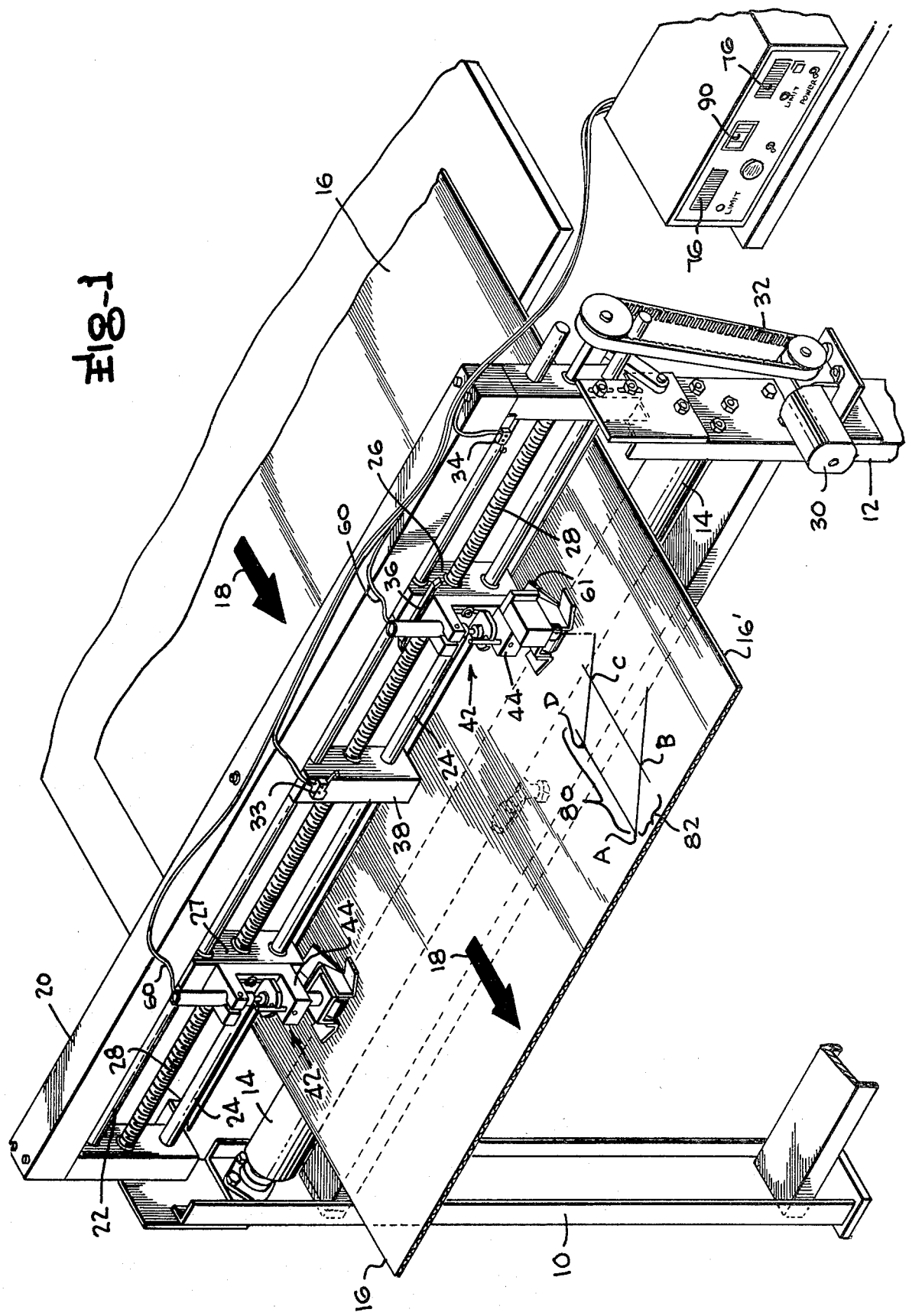

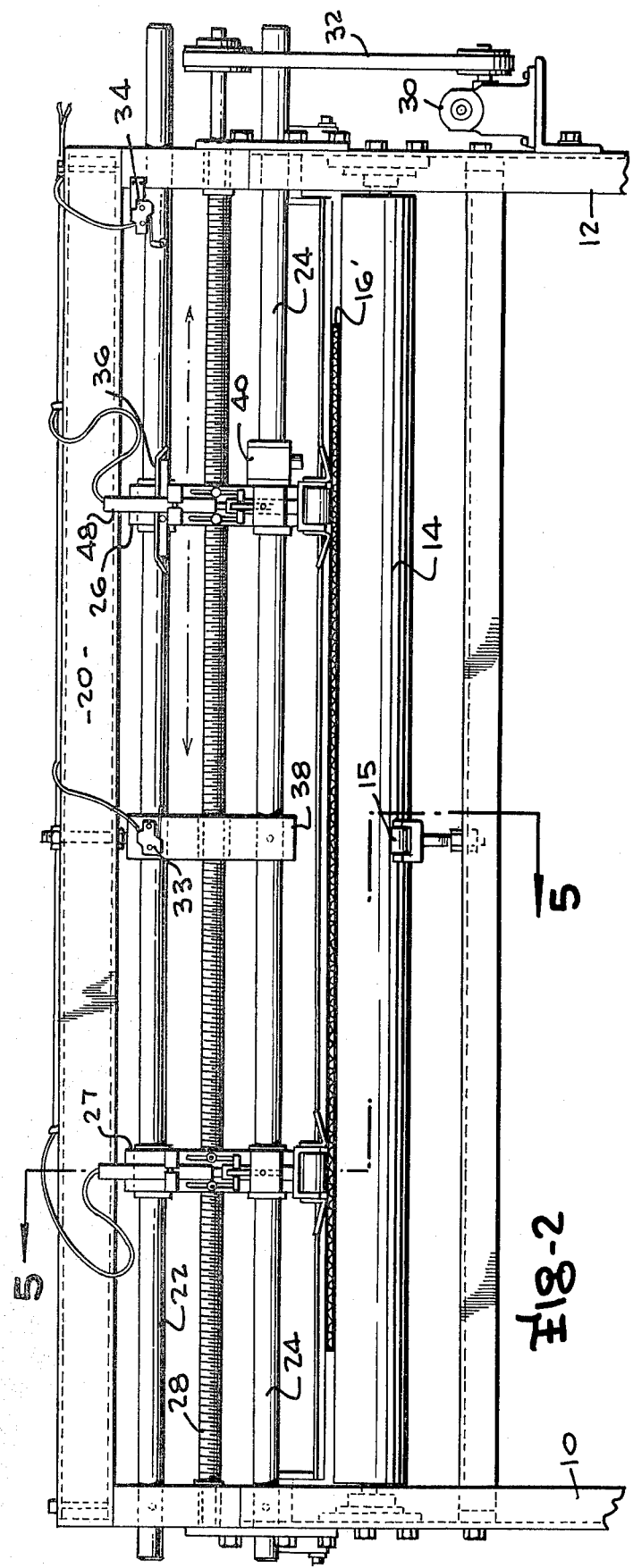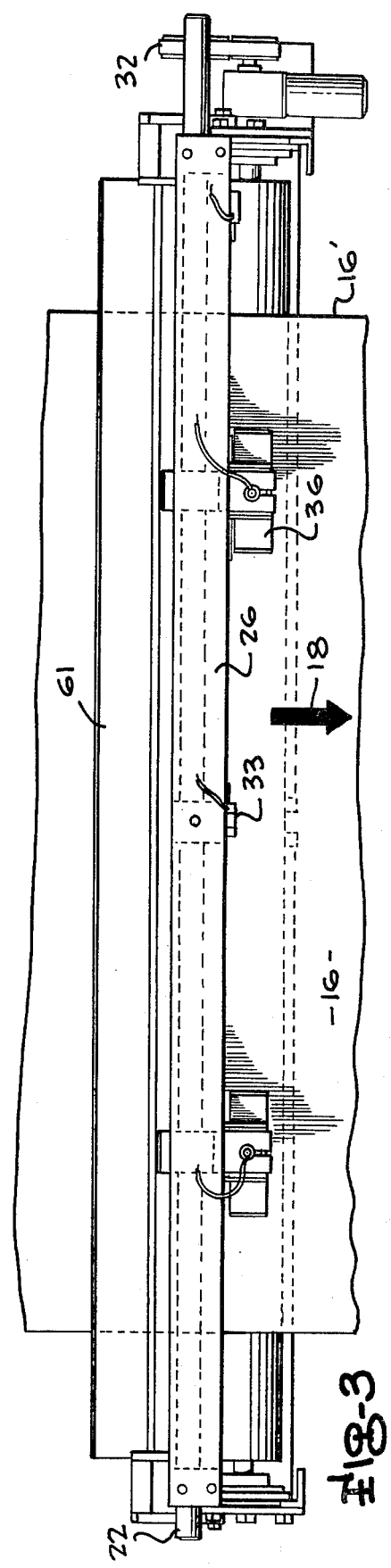

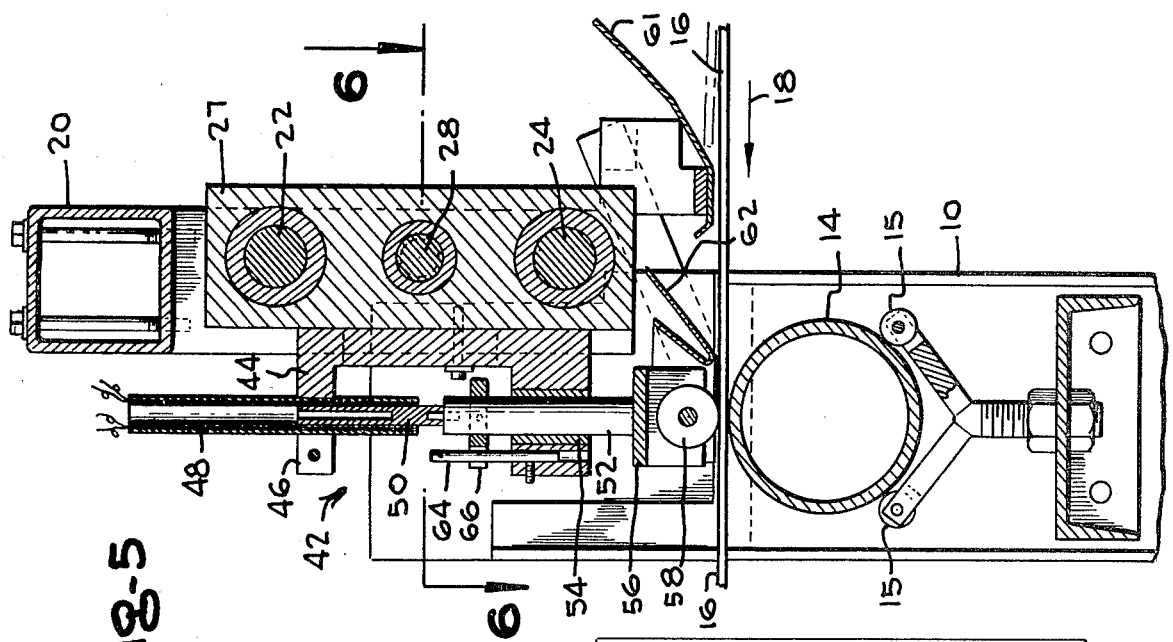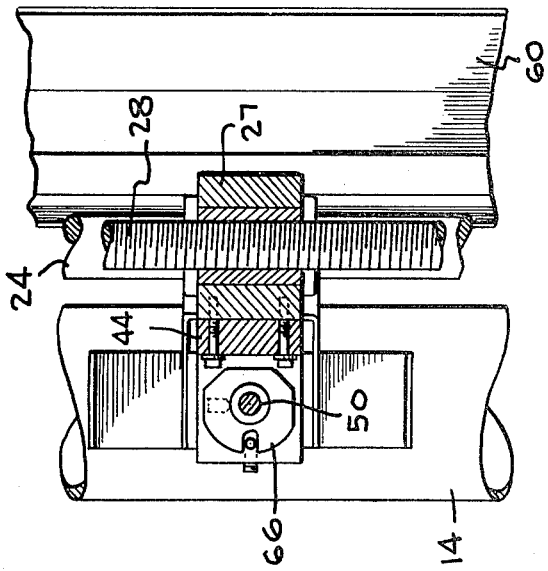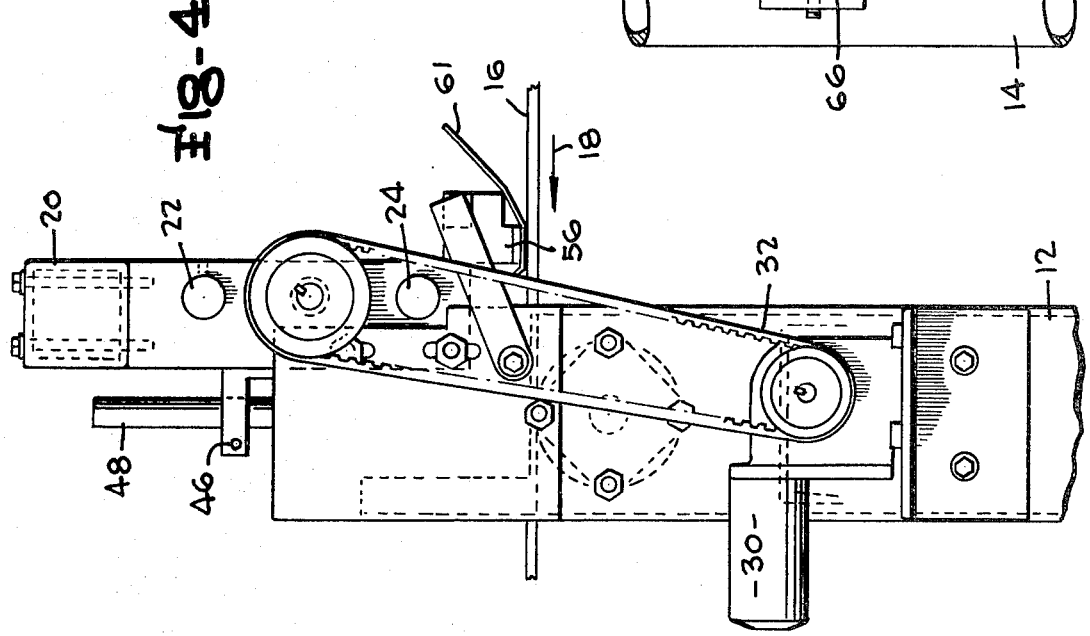

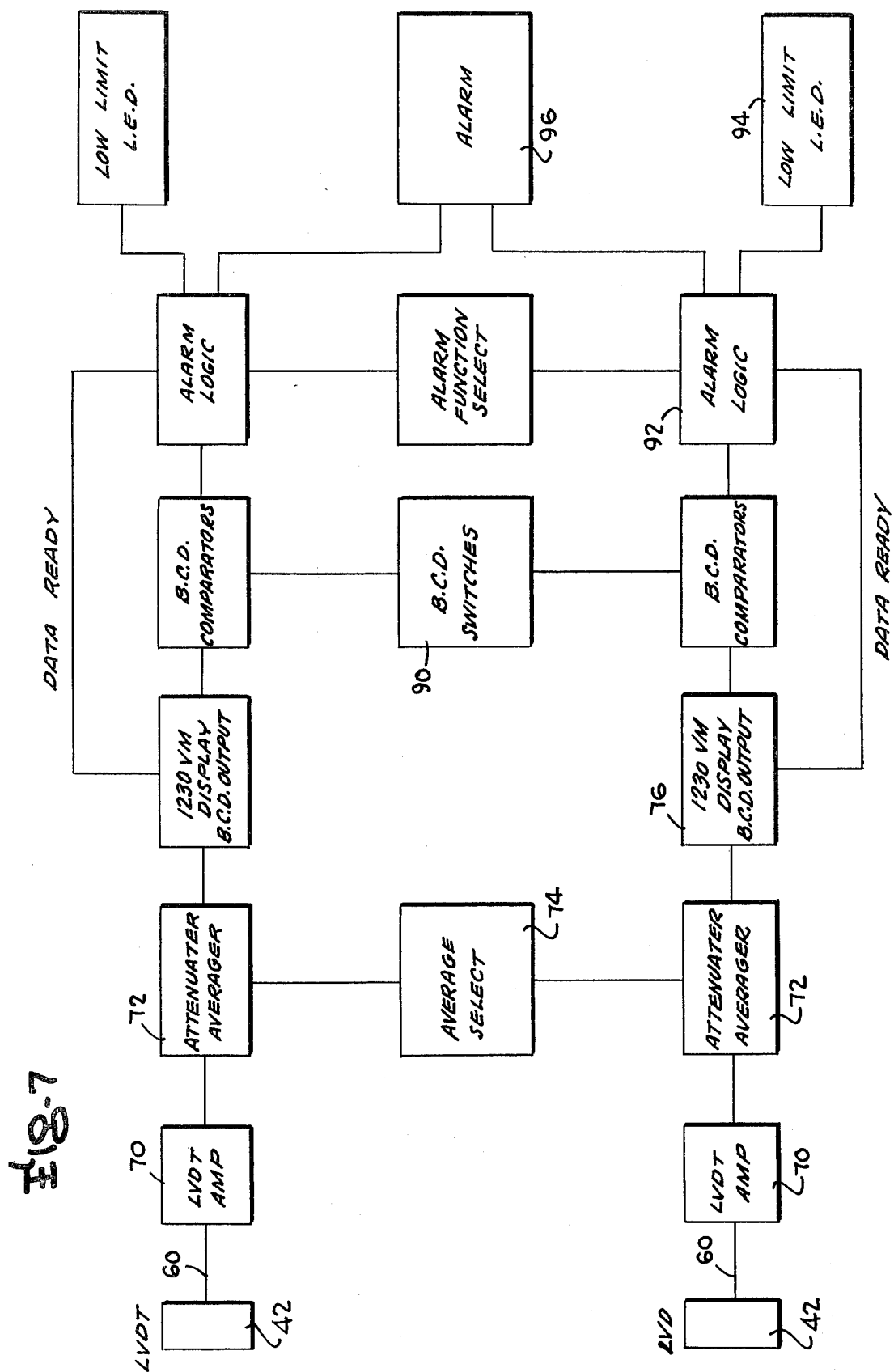

SHEET THICKNESS MONITORING SYSTEM AND METHOD

BACKGROUND OF THE INVENTION

The present invention is in the field of thickness measuring and monitoring equipment and is more specifically directed to means for continuously monitoring the thickness of corrugated paper sheets or the like to provide an indication of any undesired departure from a desired thickness range.

Corrugated sheets formed in conventional corrugating machines are relatively hot in that they are at a temperature in the order of 250 degrees F. Such sheets are also abrasive in nature. It is consequently necessary that thickness monitoring means for such sheets be constructed in a manner to be unaffected by the relatively high temperatures and not to have any sliding contact with the sheets due to their abrasive nature. Prior sheet monitoring devices have for the most part been fixedly positioned over the conveyor means by means of which the sheets from the corrugating machine are conveyed with a substantial disadvantage of such equipment being that it merely measures the sheet thickness along a linear line extending along the length of the sheet and consequently fails to detect any dimensional irregularities transversely spaced from such linear line along which the measurements are taken. Consequently, dimensional errors can go undetected while literally thousands of sheets pass the thickness monitoring devices of this type. Other prior art devices have employed radioactive emitters and sensors which while probably safe, nevertheless create some apprehension among users of such equipment. Other problems found in the prior art machines include lack of accuracy, high expense and unreliability.

Prior known thickness monitoring devices are exemplified by the following U.S. patents:

| Patentee | Patent No. |
|---|---|
| Shoupp et al | 2,264,725 |
| Bendtsen | 2,806,373 |
| Mamas | 3,006,225 |
| Ziffer | 3,084,314 |
| Doodhall | 3,182,587 |
| Lefkowitz | 3,262,054 |
| Kebelitz et al | 3,263,460 |
| Davis | 3,306,103 |
| Gerhard et al | 3,307,215 |
| Taylor, Jr. | 3,403,447 |
| Mangan | 3,474,668 |
| Lloyd | 3,509,815 |
| Eakman | 3,599,288 |
| McCarty | 3,600,747 |
| Hays et al | 3,691,940 |
| Wennerberg | 3,828,248 |
| Wilhelm, Jr., et al | 3,914,585 |
| Atkinson | 3,974,248 |
| Edwards et al | 3,979,935 |
| Sanders | 4,031,752 |
| Stanheli | 4,041,770 |
| Mitzel | 4,068,385 |
| Herzhoff | 4,095,063 |

Therefore, it is the primary object of the present invention to provide a new and improved apparatus and method for monitoring the thickness of sheet material.

The achievement of the foregoing object is enabled through the preferred embodiment by the provision of first and second linear variable differential transformers mounted on a threaded support shaft above a conveyor so as to have their lower end portions including roller means engagable with the upper surface of the corrugated sheets fed outwardly along the length of the conveyor. Variations in thickness of the corrugated board are detected by the linear variable differential transformers which provides an output signal which is amplified and fed to a attenuator averager. The attenuator averager provides an output signal indicative of the average output signal of the linear variable differential transformer over a predetermined time period which is also indicative of the average thickness of the corrugated board having passed beneath the linear variable transformer during such time period. The output from the attenuator averager is directed to a display which provides a visual readout of the actual thickness of the corrugated cardboard and which is compared by a comparator with a predetermined minimum desired thickness to trigger an alarm in the event that the thickness falls below a predetermined acceptable minimum value. Additionally, the fact that the linear variable differential transformer is being reciprocated transversely with respect to the direction of movement of the corrugated board provides an averaging effect transversely of the board width so that the output of the attenuator averager actually represents the average thickness over a parallelogram shaped area of the corrugated board the exact dimensions of which area are determined by the velocity at which the board is fed beneath the linear variable differential transformers and the velocity with which the linear variable differential transformer is moved transversely across the width of the board.

A better understanding of the manner in which the preferred embodiment achieves the foregoing object will be enabled when the detailed description is considered in conjunction with the appended drawings in which like referenced numerals are used in the different figures for illustration of the same parts.

DESCRIPTION OF THE DRAWINGS

FIG. 1 is a perspective view of the mechanical and electrical components of the preferred embodiment;

FIG. 2 is a front elevation view of the mechanical components;

FIG. 3 is a plan view of the mechanical components;

FIG. 4 is a side elevation view of the mechanical components;

FIG. 5 is a sectional view taken along lines 5—5 of FIG. 2;

FIG. 6 is a sectional view taken along lines 6—6 of FIG. 5; and

FIG. 7 is a block diagram of the electrical components of the preferred embodiment.

DESCRIPTION OF THE PREFERRED EMBODIMENT

Attention is initially invited to FIG. 1 of the drawings which illustrates frame means including first and second vertical standards 10 and 12 between which a backup roller 14 extends to provide support for travelling sheets of corrugated board 16 fed by a conveyer 17 in the direction of arrows 18. Carrier rollers 15 engage and support the center of backup roller 14 to minimize flexing of roller 14.

A head frame 20 extends transversely above the path of the corrugated board 16 and is supported between the vertical standards 10 and 12. Head frame 20 additionally includes first and second horizontal polished slide guide rods 22 and 24 on which a pair of carriage blocks 26 and 27 are mounted for reciprocation transversely with respect to the direction of movement of the corrugated board 16. Reciprocation of the carriage blocks 26 and 27 is effected by rotation of a threaded shaft 28 extending through threaded drive couplings provided in each of the slide carriage blocks 26. Threaded shaft 28 is driven by a reversible motor 30 by means of a splined belt 32 in a manner that will be obvious from inspection of FIG. 1. Conventional motor control circuitry includes first and second micro switches 33 and 34 fixedly mounted on the head frame 20 to be engaged by a switch actuator 36 on the right-hand carriage block 26.

It should be observed that the head from 20 includes a downwardly extending hanger support block 38 positioned centrally of the head frame 20 which provides support for the middle portions of the slide guide rods 22 and 24 and the threaded shaft 28. The threads of threaded shaft 28 on opposite sides of the hanger support block 38 are of reverse orientation so that rotation of the threaded rod 28 effects movement of the two carriage blocks 26 and 27 in opposite directions. More specifically, both of the carriage blocks will be moved toward the hanger support block 38 at the same speed until the switch actuator 36 engages the micro switch 33 to cause the motor control to stop the motor and initiate reverse operation of the motor 30 to consequently reverse the direction of rotation of the threaded shaft 28 and initiate movement of the carriage blocks 26 and 27 outwardly toward the respective side edges of the corrugated board. Such outward movement is terminated by engagement of the switch actuator 36 with the micro switch 34 or by the detection of the edge 16' of the sheet 16 by a photoelectric detector 40 mounted on the first carriage block 26. Basically, the photoelectric detector normally serves to terminate operation of the reversible motor 30 with the micro switch 34 serving as a backup in the event of failure of the photoelectric means. In any event, actuation of either of the micro switches 33, 34 or the photoelectric means 40 serves to deactivate the motor and start a time delay relay which after a predetermined time delay period reactivates the motor to drive same in an opposite direction.

A linear variable differential transformer generally designated 42 of conventional design is mounted on each of carriage blocks 26 and 27 with the linear variable differential transformer mounted on carriage block 27 being illustrated in detail in FIG. 5. It should be understood that the linear variable differential transformers are identical. The specific construction includes a U-shaped support bracket 44 having a bifurcated upper end 46 in which a vertically adjustable tube 48 enclosing primary and secondary coils of a transformer is clampingly held in adjusted position. A movable armature core 50 is mounted for axial reciprocation within the primary and secondary cores in tube 48 and has its lower end connected to a carrier rod 52 mounted for axial reciprocation in a bushing 54 in the lower arm of the U-shaped support bracket 44. A roller carrier bracket 56 is attached to the lower end of the carrier rod 52 and supports a roller 58 resting on the upper surface of the corrugated board 16. Variation in the thickness of corrugated board 16 results in vertical movement of rod 52 and movable armature core 50 so that there will be a variation in voltage in conductor 60 extending from the secondary coil of the linear variable differential transformer.

A deflector or guide plate 61 is mounted transversely across the path of the boards 16 so as to guide the front edge of such board downwardly beneath the head frame to pass beneath the rollers 58 with additional front edge guidance being provided a movable deflector panel 62 mounted on the roller carrier bracket 56 immediately forward to roller 58 as shown in FIG. 5.

A fixed pin 64 mounted on the lower arm of the U-shaped support bracket 44 extends through a slot in a disc 66 attached to the upper portion of the carrier rod 52. Disc 66 is freely movable upwardly and downwardly with respect to pin 64 with the pin 64 preventing rotation of the disc in the carrier rod 52 so that the roller 58 is always correctly positioned with its axis perpendicular to the direction of movement 18 of the corrugated board 16.

FIG. 7 illustrates the circuitry operable for effecting the monitoring of the thickness of the corrugated board 16 on a continuous basis without interruption. Specifically, both of the linear variable differential transformers 42 are connected by a conductor 60 from their secondary coils to a linear variable differential transformer amplifier 70 which provides an output signal proportional to the instantaneous thickness of the corrugated board which signal is directed to an attenuator averager 72 which averages the signal strength for a given time period selectively determined by an adjustable control switch 74. The time period for the attenuator averager will be selected in accordance with the speed of movement of the corrugated board 18 so as to provide an average output reading during the time that the corrugated board moves a lengthwise distance 80; however, the carriage block is simultaneously moved transversely (in the example of FIG. 1 the carriage block 16 is assumed to be moving toward hanger support 38) to the direction of movement 18 of the corrugated board and will move a transverse distance 82 during the averaging time period. Consequently, the output of the attenuator averager 72 is indicative of the average thickness of a parallelogram shaped area A,B,C,D, as shown in FIG. 1. The dimensions and exact shape of the parallelogram will vary in accordance with the speed of movement of the corrugated board, the speed of transverse movement of the sensors caused by rotation of threaded shaft 28 and the setting of the average select switch means 74. More specifically, the lengthwise dimension 80 will increase with an increase of the speed of the corrugated board 16 and/or an increase in the time factor for the lengthwise averaging provided by the average select switch means 74. The transverse dimension 82 will similarly increase in the time period for the averaging process provided by the average select switch means 74. Dimension 82 increases with any increase in the speed in the transverse movement of the sensor effected by an increase in the speed of rotation of the threaded shaft 28.

Since both of the sensors are normally operated at the same time, the cardboard thickness is continuously monitored over substantial areas to greatly increase the chances of detecting any areas of malformations in the corrugated board. The system components are selected so that the output of the attenuator averager will vary 1 millivolt with each 0.001 inch variation in the corrugated board thickness. A commercial digital volt meter 76 receives the output from the attenuator averager 72 so as to consequently display the momentary thickness of the averaged area as the board is fed beneath the sensing means. The meter 76 uses a binary coded decimal output which is compared to a preset thickness provided by thumbnail switch means in a selector switch 90 which is manually set by the operator. If a comparator detects that the average thickness has fallen below the predetermined level set by the operator in the selector switch 90, a signal is provided to alarm initiate signal means 92 which provide an initiation of a visual signal warning signal device 94 and/or a warning horn or alarm 96 which can be heard by the operator to immediately effect correction of whatever problem is creating the improper thickness in the corrugated board.

While the preferred embodiment of the invention is directed to means for detecting thickness falling below a predetermined value, it should be understood that the system could be equally usable in detecting boards having a thickness in excess of a predetermined value. Moreover, the apparatus could also be used with additional detectors so as to be capable of detecting both overly thick and overly thin variations simultaneously so as to monitor the board thickness to insure it remains within a desired range. Numerous modifications of the preferred embodiment will undoubtedly occur to those skilled in the art and it should be understood that the sphere and scope of the invention is to be limited solely by the appended claims.

I claim:

1. A method of monitoring the thickness of sheet material comprising the steps of:
  moving the sheet material past a measuring station having a sheet thickness measuring means;
  operating said sheet thickness measuring means while moving said thickness measuring means transversely with respect to the direction of sheet movement to provide an instantaneous output signal indicative of the sheet thickness adjacent said measuring means at any given moment;
  directing said instantaneous output signal to averaging means for providing an average voltage signal indicative of the average value of said output signal over an immediately preceeding predetermined time period;
  monitoring said average signal to actuate warning means in response to said average signal falling below or exceeding preset value.
  moving the sheet material past a second sheet thickness measuring means transversely spaced from said first mentioned sheet thickness measuring means;
  operating said second sheet thickness measuring means while moving said second sheet thickness measuring means transversely with respect to the direction of sheet movement in a direction opposite the direction of movement of the first mentioned sheet thickness measuring means to provide second instantaneous output signal indicative of the sheet thickness adjacent said second sheet thickness measuring means at any given moment;
  directing said second instantaneous output signal to averaging means for providing a second average voltage signal indicative of the average value of said second instantaneous output signal over an immediately preceeding predetermined time period; and
  monitoring said second average signal to actuate said warning means in response to said second average signal falling below or exceeding said preset value.

* * * * *